United States Patent
Takeda

(10) Patent No.: US 12,275,111 B2
(45) Date of Patent: Apr. 15, 2025

(54) WORKPIECE CONVEYING APPARATUS AND MOUNTING AND DISMOUNTING SUPPORT MECHANISM FOR A WORKPIECE HOLDING DEVICE THEREOF

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 384 days.

(21) Appl. No.: 17/855,203

(22) Filed: Jun. 30, 2022

(65) Prior Publication Data
US 2023/0010277 A1 Jan. 12, 2023

(30) Foreign Application Priority Data
Jul. 6, 2021 (JP) .................................. 2021-112062

(51) Int. Cl.
*B23Q 5/22* (2006.01)
(52) U.S. Cl.
CPC ...................................... *B23Q 5/22* (2013.01)
(58) Field of Classification Search
None
See application file for complete search history.

(56) References Cited

FOREIGN PATENT DOCUMENTS

| | | |
|---|---|---|
| JP | S59-14487 A | 1/1984 |
| JP | S63-180487 A | 7/1988 |
| JP | H05-277593 A | 10/1993 |
| JP | H06-024879 U | 4/1994 |
| JP | H09-11171 A | 1/1997 |
| JP | 2009-160604 A | 7/2009 |
| KR | 101 917 321 B1 | 1/2019 |

OTHER PUBLICATIONS

Extended European Search Report issued in corresponding European Application No. 22180411.5, dated Dec. 9, 2022 (5 pages).
Notice of Reasons for Refusal received in corresponding Japanese Patent Application No. 2021-112062, dated Jun. 6, 2024.

*Primary Examiner* — Michael S Lowe
(74) *Attorney, Agent, or Firm* — Rimon P.C.

(57) ABSTRACT

The present invention includes a link mechanism including a movable member, a first coupling shaft, a first coupling member, a second coupling shaft, a second coupling member, and a third coupling shaft. When the movable member moves to a predetermined engagement position, a straight line connecting the first coupling shaft and the second coupling shaft to each other in a plane orthogonal the first coupling shaft and the second coupling shaft and a straight line connecting the second coupling shaft and the third coupling shaft to each other in a plane orthogonal the second coupling shaft and the third coupling shaft are orthogonal to each other.

7 Claims, 11 Drawing Sheets

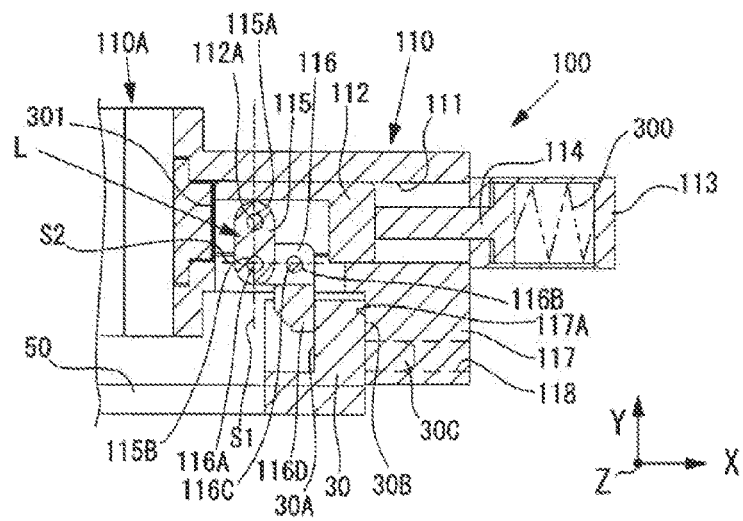

WORKPIECE CONVEYING APPARATUS AND MOUNTING AND DISMOUNTING SUPPORT MECHANISM FOR A WORKPIECE HOLDING DEVICE THEREOF

CROSS-REFERENCE TO RELATED APPLICATIONS

This application claims priority under 35 U.S.C. § 119 to Japanese Patent Application No. 2021-112062, filed on Jul. 6, 2021. The above application is hereby expressly incorporated by reference, in its entirety, into the present application.

BACKGROUND OF THE INVENTION

1. Field of the Invention

The present invention relates to a mounting and dismounting support mechanism for a workpiece holding device with respect to a workpiece conveying apparatus, which is employed in, for example, a pressing machine (press machine).

2. Description of the Related Art

Hitherto, there have been proposed various workpiece conveying apparatus configured to load and unload workpieces with respect to a press machine, or convey workpieces between press machines.

In general, a workpiece conveying apparatus that conveys a workpiece from an upstream step to a downstream step includes a workpiece holding device. The workpiece holding device is operated to hold a workpiece in the upstream step by drawing means such as vacuum suction or magnetic attraction, then, be moved to the downstream step under the holding state, and release the suction by the drawing means in the downstream step to release the workpiece.

Here, when a shape of the workpiece to be conveyed is changed, and it is required to change the specifications such as arrangement or the number of the drawing means, it is conceivable to employ a workpiece holding device of a so-called mounting and dismounting type (attaching and detaching type) in which the workpiece holding device having been used so far is detached (removed) from the workpiece conveying apparatus, and a workpiece holding device adapted to the specifications is mounted (installed for replacement) to the workpiece conveying apparatus.

In such a case, for example, in Patent Literature 1, the following configuration is employed. As illustrated in FIG. 9, a workpiece conveying apparatus holder 1000 includes a holder main body 1100 and an engagement mechanism 1200. An attachment 2000 including a suction cup is inserted into a through hole 1110 of the holder main body, and an engagement lever 1210 of the engagement mechanism is elastically biased to be engaged with an annular groove 2100 engraved in the vicinity of a distal end of the attachment 2000 so that the attachment 2000 is mounted to the holder main body 1100. When the attachment 2000 is to be removed, the engagement between the engagement lever 1210 and the annular groove is canceled, and the attachment 2000 is pulled out from the holder main body 1100.

Herein, Patent Literature 1 corresponds to Japanese Patent Application Laid-open No. 2009-160604.

However, in the device of Patent Literature 1, the engagement lever 1210 is inserted into and engaged with the annular groove 2100 of the attachment. Thus, there is a fear in that, due to a gap (backlash) between a width of the annular groove and a width of the engagement lever in an axial direction of the attachment, the attachment freely moves with respect to the workpiece conveying apparatus holder in the axial direction. In such a mechanism, when the workpiece is to be conveyed at high speed, vibration or noise increases due to the backlash, with the result that achievement of high-speed conveyance is inhibited.

Further, in Patent Literature 1, it is proposed that an operator fixes the attachment to the holder main body using a rope or the like in order to suppress the backlash. However, in this proposed method, improvement is required in terms of more reliable backlash suppression and practical operation efficiency.

Further, when automatic replacement of the attachment is assumed, in the device of Patent Literature 1, for example, a structure of pushing and pulling a disengagement pin 1220 by an actuator such as an air cylinder is conceivable. In such a case, there is no problem when the annular groove 2100 of the attachment 2000 is located at a position at which the annular groove 2100 is capable of engaging with the engagement lever 1210. However, when the annular groove 2100 is located at a slightly deviated position, it is difficult to allow the engagement lever 1210 to be properly engaged with the annular groove 2100. This is because, for example, when the device is used for many years, the positional relationship between the engagement lever 1210 and the annular groove 2100 may be changed due to, for example, wear of an abutment portion or a sliding portion. The engagement between the engagement lever 1210 and the annular groove 2100 influences prevention of detachment of the attachment 2000 from the workpiece conveying apparatus holder 1000 or prevention of failure of a machine in execution of a workpiece conveying operation, and hence it is required to stably hold the attachment 2000.

SUMMARY OF THE INVENTION

According to at least one aspect of the present invention, there is provided a mounting and dismounting support mechanism for a workpiece holding device of a workpiece conveying apparatus, which is configured to cause a workpiece holding device that freely removably holds a workpiece to be freely removably supported on a workpiece conveying apparatus, the workpiece conveying apparatus including one of a positioning male element or a positioning female element, and the workpiece holding device including one of a positioning female element or a positioning male element corresponding to the one of the positioning male element or the positioning female element of the workpiece conveying apparatus, the one of the positioning male element or the positioning female element of the workpiece holding device being inserted into the one of the positioning male element or the positioning female element of the workpiece conveying apparatus so that the workpiece holding device and the workpiece conveying apparatus are brought into abutment against each other at a predetermined position to perform positioning between the workpiece holding device and the workpiece conveying apparatus. The mounting and dismounting support mechanism includes: a movable member which is mounted to at least one of the workpiece conveying apparatus or the workpiece holding device, and is linearly reciprocable along the insertion direction by a linear drive mechanism; a first coupling shaft extending integrally with the movable member along a direction substantially orthogonal to the reciprocating linear motion direction; a first coupling member coupled so as to be turnable about the first coupling shaft; a second coupling shaft extending integrally with the first coupling member in parallel to and at a predetermined distance from the first coupling shaft; and a second coupling member coupled so as to be turnable about the second coupling shaft. The second coupling member is turnably supported by a third coupling shaft integrally extending from the at least one of the workpiece conveying apparatus or the workpiece holding device in parallel to and at a predetermined distance from the second coupling shaft. The second coupling member includes a locking portion that turns about the third coupling shaft in a predetermined direction through intermediation of the first coupling member and comes into abutment against an engagement portion of another one of the workpiece conveying apparatus or the workpiece holding device to lock the engagement portion with respect to the at least one of the workpiece conveying apparatus or the workpiece holding device when the movable member moves to a predetermined engagement position, and turns about the third coupling shaft through intermediation of the first coupling member in a direction reverse to the predetermined direction to be retreated from the engagement portion when the movable member moves to a predetermined retreated position. When the movable member moves to the predetermined engagement position, a straight line connecting the first coupling shaft and the second coupling shaft to each other in a plane orthogonal to the first coupling shaft and the second coupling shaft and a straight line connecting the second coupling shaft and the third coupling shaft to each other in a plane orthogonal to the second coupling shaft and the third coupling shaft are orthogonal to each other.

According to at least one aspect of the present invention, the workpiece holding device includes one of a positioning female element or a positioning male element corresponding to one of a positioning male element or a positioning female element provided in a workpiece holding tool that freely removably holds a workpiece. Under a state in which the one of the positioning male element or the positioning female element of the workpiece holding tool is inserted into the one of the positioning female element or the positioning male element of the workpiece holding device so that the workpiece holding tool and the workpiece holding device are brought into abutment against each other at a predetermined position to perform positioning between the workpiece holding tool and the workpiece holding device, when the one of the positioning male element or the positioning female element of the workpiece holding device is inserted into the one of the positioning male element or the positioning female element of the workpiece conveying apparatus so that the workpiece holding device and the workpiece conveying apparatus are brought into abutment against each other at the predetermined position to perform positioning between the workpiece holding device and the workpiece conveying apparatus, a restricting portion provided in the workpiece conveying apparatus acts on a part of the workpiece holding tool to restrict movement of the workpiece holding tool in a direction of moving away from the workpiece holding device.

According to at least one aspect of the present invention, the mounting and dismounting support mechanism for a workpiece holding device of a workpiece conveying apparatus includes one of an elastic element that elastically biases the movable member toward a predetermined engagement position when the movable member moves to the predetermined engagement position or a magnetic attraction element that attracts and holds the movable member at the predetermined engagement position when the movable member moves to the predetermined engagement position.

According to at least one aspect of the present invention, there is provided a workpiece conveying apparatus including a conveying arm which is rotatable within a horizontal plane; a swivel member supported at a distal end of the conveying arm; a cylinder fixed to the swivel member in a horizontal direction; a piston slidable in the cylinder; a link member which is rotatably supported by the piston; an inflective locking member which is rotatably supported between the link member and the cylinder; and a position-determining portion provided to the cylinder. The inflective locking member keeps the link member orthogonal to the horizontal plane while a workpiece holding device is bookended between the inflective locking member and the position-determining portion.

According to at least one aspect of the present invention, in the workpiece conveying apparatus, the orthogonal direction of the link member is a straight line connected between the first coupling pin and a second coupling pin, and the link member is supported by the piston through the first coupling pin and supported by the inflective locking member through the second coupling pin.

According to at least one aspect of the present invention, in the workpiece conveying apparatus, the position-determining portion is provided under the cylinder.

BRIEF DESCRIPTION OF THE DRAWINGS

FIG. 5A is an enlarged sectional view for illustrating a link mechanism part in the engagement state of the engagement device of the embodiment.

FIG. 5B is an enlarged sectional view for illustrating the link mechanism part in the disengagement state of the engagement device.

FIG. 5C is an enlarged sectional view for illustrating the link mechanism part in the separated state of the engagement device.

DESCRIPTION OF THE EMBODIMENTS

Now, with reference to the accompanying drawings, description is made of an example of a mounting and dismounting support mechanism for a workpiece holding device with respect to a workpiece conveying apparatus according to an embodiment of the present invention. The present invention is not limited to the embodiment described below.

The present invention has been made in view of the above-mentioned circumstances, and has an object to provide the mounting and dismounting mechanism for a workpiece holding device of a workpiece conveying apparatus, which is capable of causing the workpiece holding device to be removably engaged with and supported on the workpiece conveying apparatus without free movement highly accurately and reliably by a simple operation, and consequently simplifying a replacement operation of the workpiece holding device and contributing to achievement of high-speed conveyance of the workpiece.

Now, a configuration example of a workpiece conveying apparatus for a pressing machine according to this embodiment is described.

Figure 1:
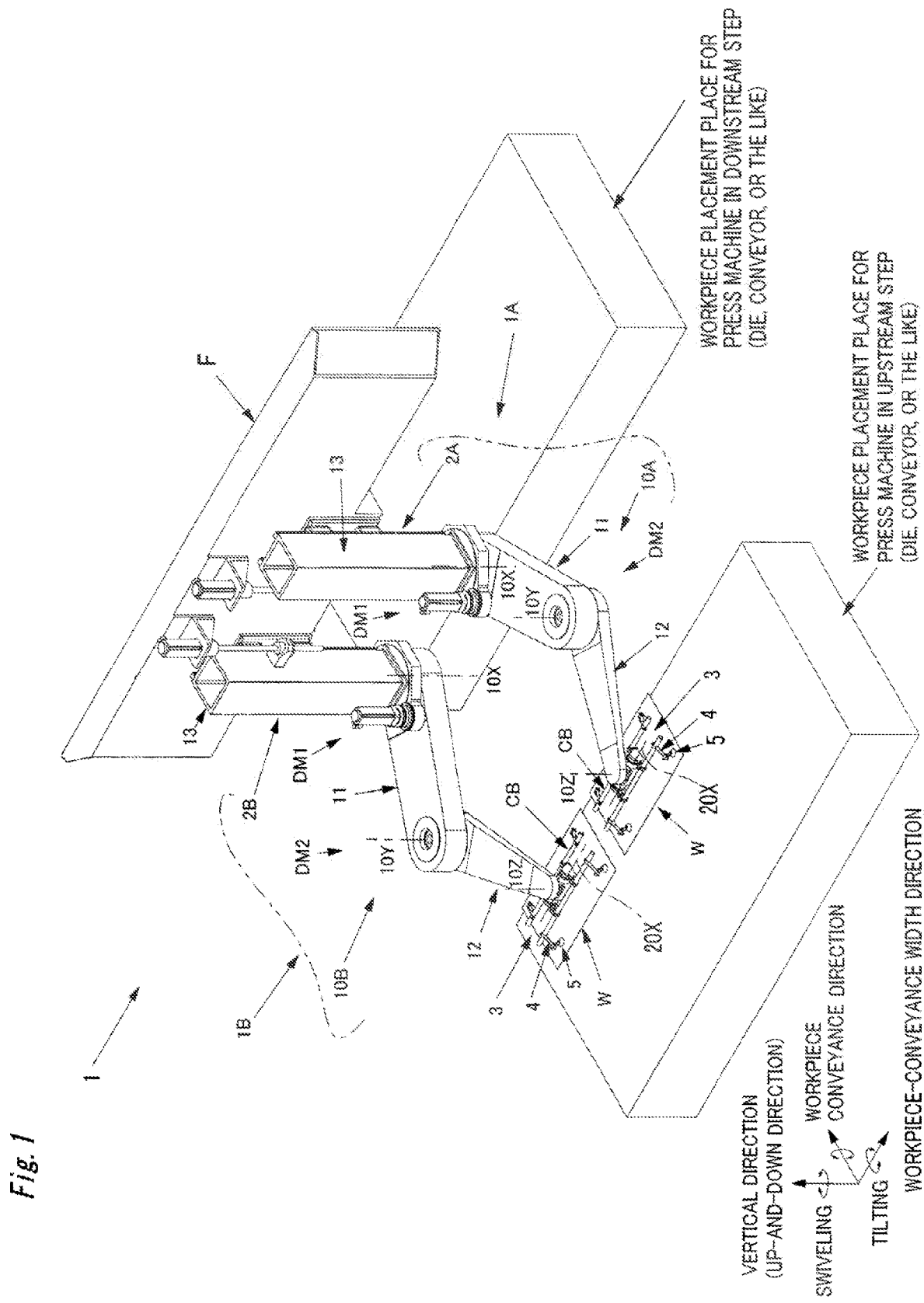
FIG. 1 is a perspective view for illustrating an overall configuration of a workpiece conveying apparatus according to one embodiment of the present invention.
Figure 2:
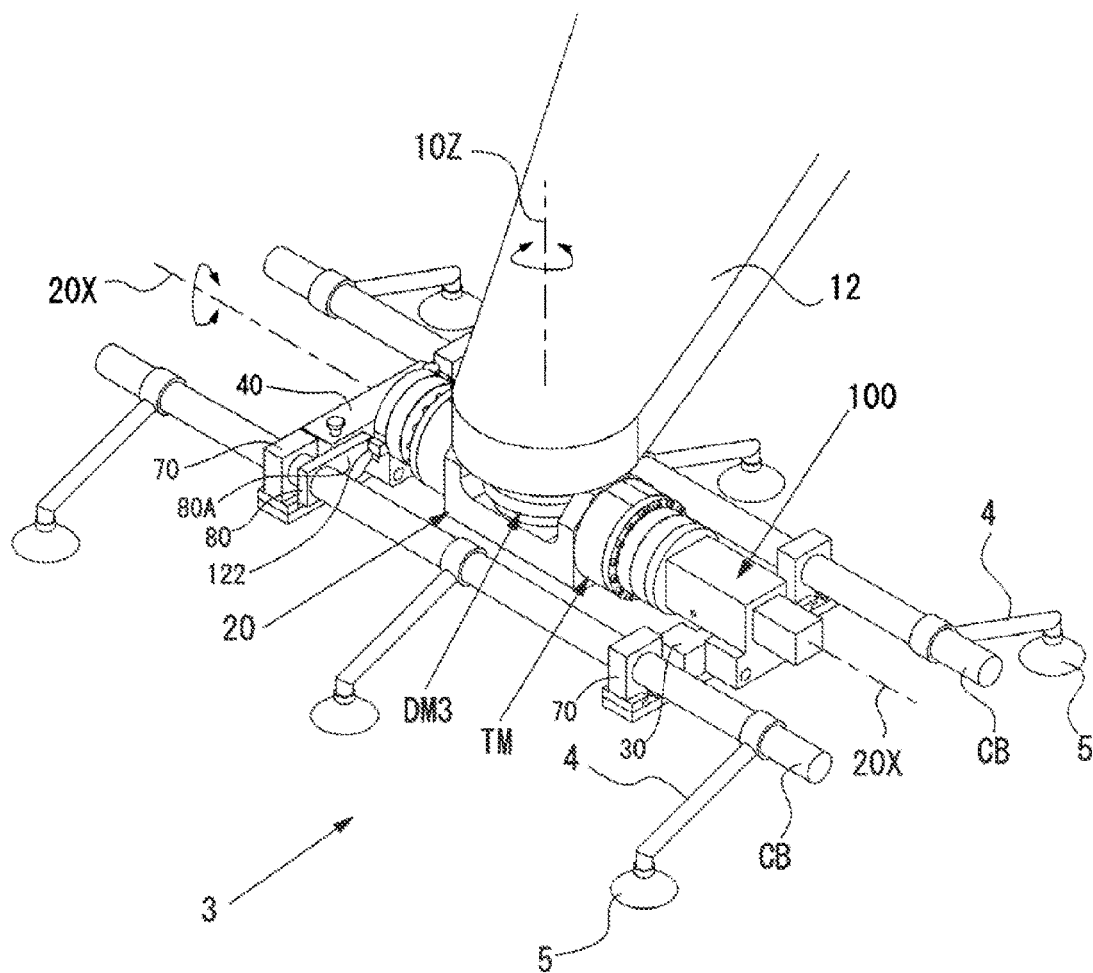
FIG. 2 is an enlarged perspective view for illustrating a distal end of a conveying arm of the workpiece conveying apparatus and a workpiece holding device (engagement state) according to the embodiment.

FIG. 1 is a perspective view for illustrating an overall configuration of a workpiece conveying apparatus according to this embodiment, and FIG. 2 is an enlarged perspective view for illustrating a distal end of the workpiece conveying apparatus and a workpiece holding device according to this embodiment.

In a workpiece conveying apparatus 1 for a pressing machine according to this embodiment, as illustrated in FIG. 1, two SCARA robots (robots) 1A and 1B are supported on a stationary frame F so as to be movable in an up-and-down direction (vertical direction). The stationary frame F is stationarily installed to a press line (press machine) or the like along a width direction of a workpiece conveyance direction (workpiece-conveyance width direction).

The two SCARA robots (robots) 1A and 1B include arm units 10A and 10B, respectively, each including two conveying arms (a first arm 11 (upper arm) and a second arm 12 (front arm)).

Further, raising and lowering mechanisms 2A and 2B, which are configured to raise and lower the two SCARA robots 1A and 1B with respect to the stationary frame F, respectively and independently of each other (mutually independently), are provided.

In addition, workpiece holding devices 3 are supported on distal ends of second arms 12 of the two arm units 10A and 10B, respectively.

However, the workpiece conveying apparatus according to at least one embodiment of the present invention may include only one SCARA robot. Further, a configuration without the raising and lowering mechanisms (2A and 2B) may also be employed.

The workpiece holding devices 3 according to this embodiment is capable of holding and releasing a workpiece W by a drawing device 5 (workpiece holding device utilizing magnetic attraction or vacuum (or negative pressure) suction by a suction cup or the like) supported on leg portions 4 mounted to a cross bar CB.

The raising and lowering mechanism 2A (2B), which is configured to raise and lower the SCARA robot 1A (1B), includes an electric motor (such as servomotor), a ball screw, a ball screw nut (screw), a linear guide rail and the like. The SCARA robot 1A (1B) is connected to the ball screw nut through intermediation of a raising and lowering frame 13 that is raised and lowered (or moved up and down) along the ball screw arranged substantially upright (substantially vertical).

The ball screw is rotated in a predetermined direction (or in an opposite direction) by a driving force of the electric motor so that the SCARA robot 1A (1B) can be raised in an upward direction or lowered in a downward direction.

Here, the arm unit 10A (10B) according to this embodiment includes:

the first arm 11 (upper arm), which is supported on the raising and lowering frame 13 through intermediation of a first joint 10X (a substantially perpendicular axis or a shoulder portion) so as to be freely rotatable within a substantially horizontal plane; and the second arm 12 (front arm), which is supported on a distal end of the first arm 11 through intermediation of a second joint 10Y (a substantially perpendicular axis or an elbow joint) so as to be freely rotatable (the term "rotatable" hereinafter also encompasses "turnable" and "pivotable") within the substantially horizontal plane;

the workpiece holding device 3 (cross bar CB), which is coupled to the distal end of the second arm 12 of the arm unit 10A (10B) through intermediation of a third joint 10Z so as to be freely rotatable within the substantially horizontal plane;

a first arm drive mechanism DM1 (electric motor (such as servomotor), and a speed reducer as needed), which is configured to drive the first arm 11 to rotate (swivel) about the first joint 10X with respect to the raising and lowering frame 13;

a second arm drive mechanism DM2 (electric motor (such as servomotor), and a speed reducer as needed), which is configured to drive the second arm 12 to rotate (swivel) about the second joint 10Y with respect to the first arm 11; and a workpiece holding device swivel (rotation) drive mechanism DM3, which is configured to drive the workpiece holding device 3 to rotate (swivel) about the third joint 10Z with respect to the distal end of the second arm 12.

The arm units 10A and 10B of the two robots 1A and 1B having such configuration are driven and controlled independently of each other so that, for example, the first arms 11 and the second arms 12 are rotated about respective joints by the first arm drive mechanisms DM1 and the second arm drive mechanisms DM2, thereby being capable of moving the two workpieces W (performing workpiece conveyance) independently of each other in the workpiece conveyance direction.

Here, when the specifications such as the shape of the workpiece W to be conveyed are to be changed, in the workpiece holding device 3 being a tool holder, it is required to change, for example, the length of the cross bar CB or the number or arrangement (positions) of the leg portions 4 or the drawing devices 5 with respect to the cross bar CB. However, when adjustment is made according to each change of the specifications of the workpiece, an operation is complicated, and a press working line is required to be stopped during a setup operation therefor. As a result, there is a problem in that the production efficiency is lowered.

Thus, it is assumed that a plurality of workpiece holding devices 3 which are mountable and dismountable and adapted respectively for the different specifications of the workpieces W to be conveyed are prepared in advance, and the workpiece holding device 3 adapted to the specifications of the workpiece W is installed for replacement to the distal end of the second arm 12.

However, it is required to provide a mounting and dismounting mechanism capable of causing the workpiece holding device 3 to be removably engaged with the workpiece conveying apparatus (in this case, the distal end of the second arm 12) highly accurately and reliably by a simple operation without free movement, and consequently simplifying a replacement operation of the workpiece holding device 3 and contributing to achievement of high-speed conveyance of the workpiece.

Thus, in this embodiment, with a mounting and dismounting support mechanism for a workpiece holding device having the following configuration, the workpiece holding device 3 is removably (freely removably) supported on the workpiece conveying apparatus 1.

Figure 3:
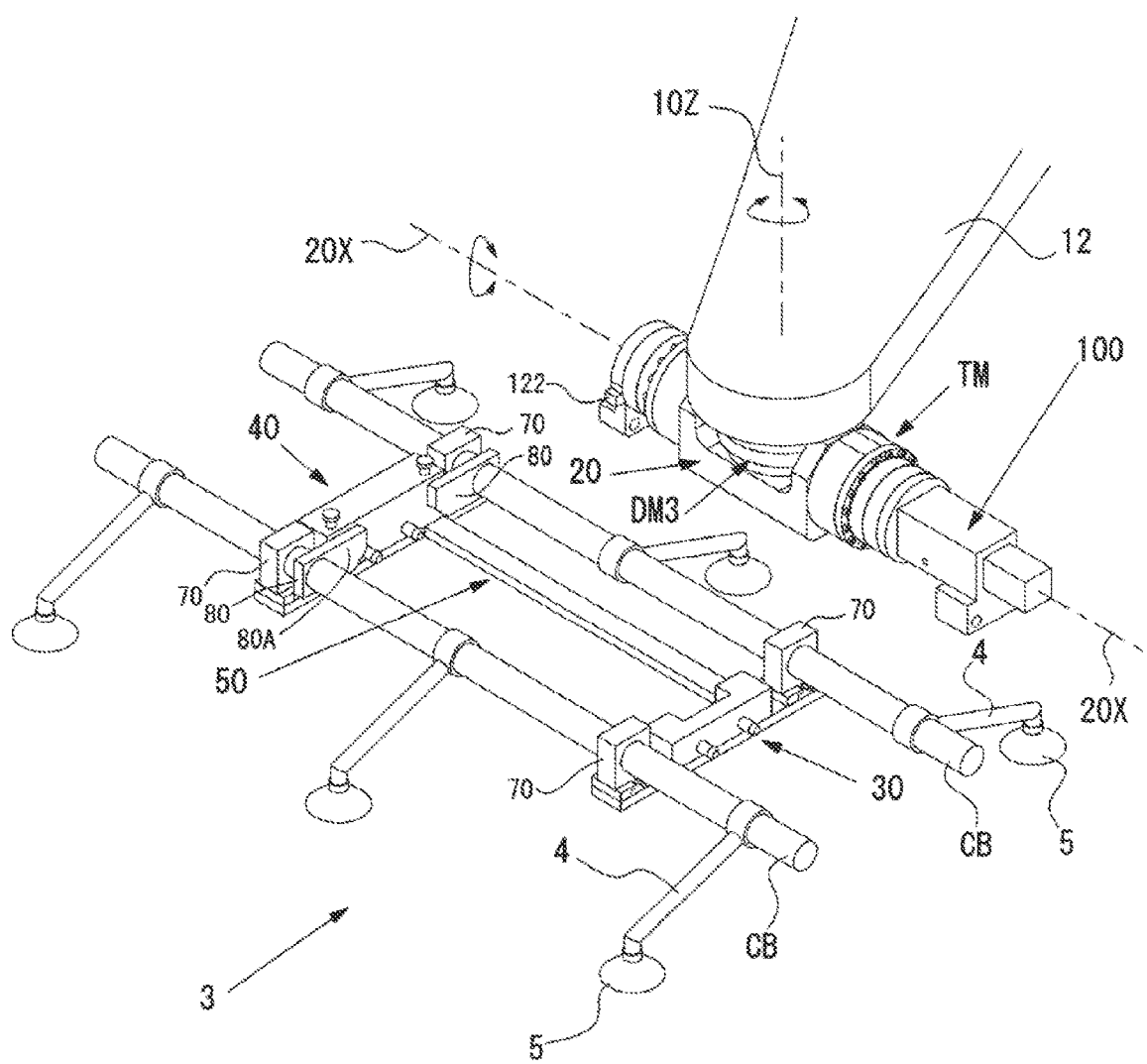
FIG. 3 is an enlarged perspective view for illustrating the distal end of the conveying arm of the workpiece conveying apparatus and the workpiece holding device (separated state) according to the embodiment.

That is, as illustrated in FIG. 2 and FIG. 3, at the distal end of the second arm 12 of the workpiece conveying apparatus 1, an engagement device 100 is supported so as to be freely rotatable (swivelable) about the third joint 10Z with respect to the distal end of the second arm 12 through intermediation of the workpiece holding device swivel (rotation) drive mechanism DM3 and a tilt drive mechanism TM.

Further, the workpiece holding device 3 is freely removably supported on the workpiece conveying apparatus 1 (second arm 12) through intermediation of the engagement device 100.

The workpiece holding device 3 is caused to rotate (swivel) about the third joint 10Z with respect to the second arm 12 by the workpiece holding device swivel drive mechanism DM3. In this manner, posture of the workpiece W within a horizontal plane during conveyance can be controlled.

Further, the tilt drive mechanism TM is configured to be capable of relatively rotating the engagement device 100 and the workpiece holding device 3 (drawing device 5) as well as the workpiece W supported thereby about the fourth joint 20X with respect to the second arm 12 by the electric motor (such as servomotor) and the speed reducer provided as needed.

The engagement device 100 is supported on the workpiece conveying apparatus 1 (second arm 12) side, and is freely removably engaged with an engagement portion 30 (40) supported on the workpiece holding device 3 side.

The engagement device 100 is caused to perform a disengagement operation from the engagement state of FIG. 2 so that the engagement between the engagement device 100 and the engagement portion 30 (40) can be canceled. With this, as illustrated in FIG. 3, the workpiece conveying apparatus 1 (second arm 12) and the workpiece holding device 3 are separated so that the workpiece holding device 3 can be removed from the workpiece conveying apparatus 1 (second arm 12).

Figure 4A:
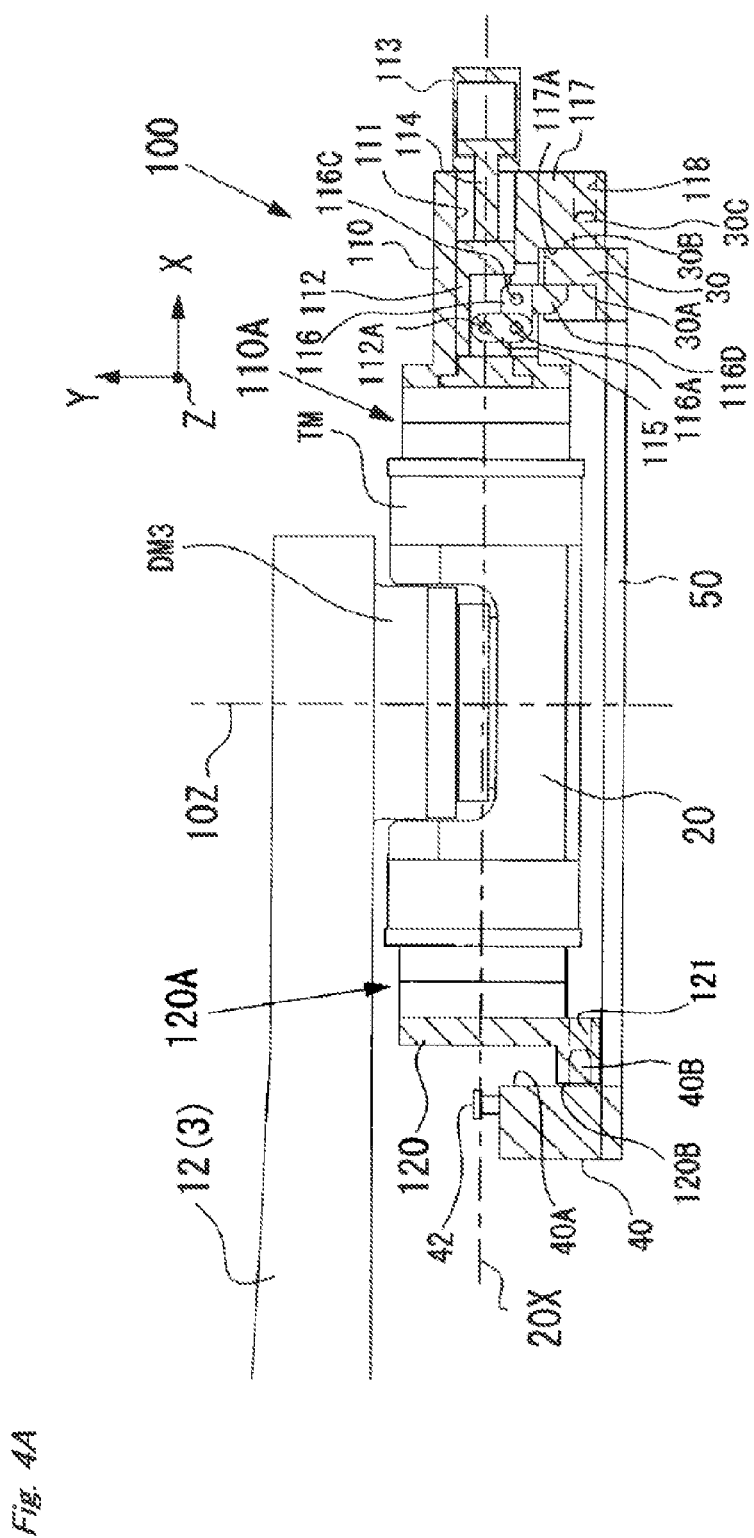
FIG. 4A is an enlarged sectional view (sectional view in a perpendicular plane passing through a fourth joint 20X) for illustrating an engagement state of an engagement device of the embodiment.
Figure 4B:
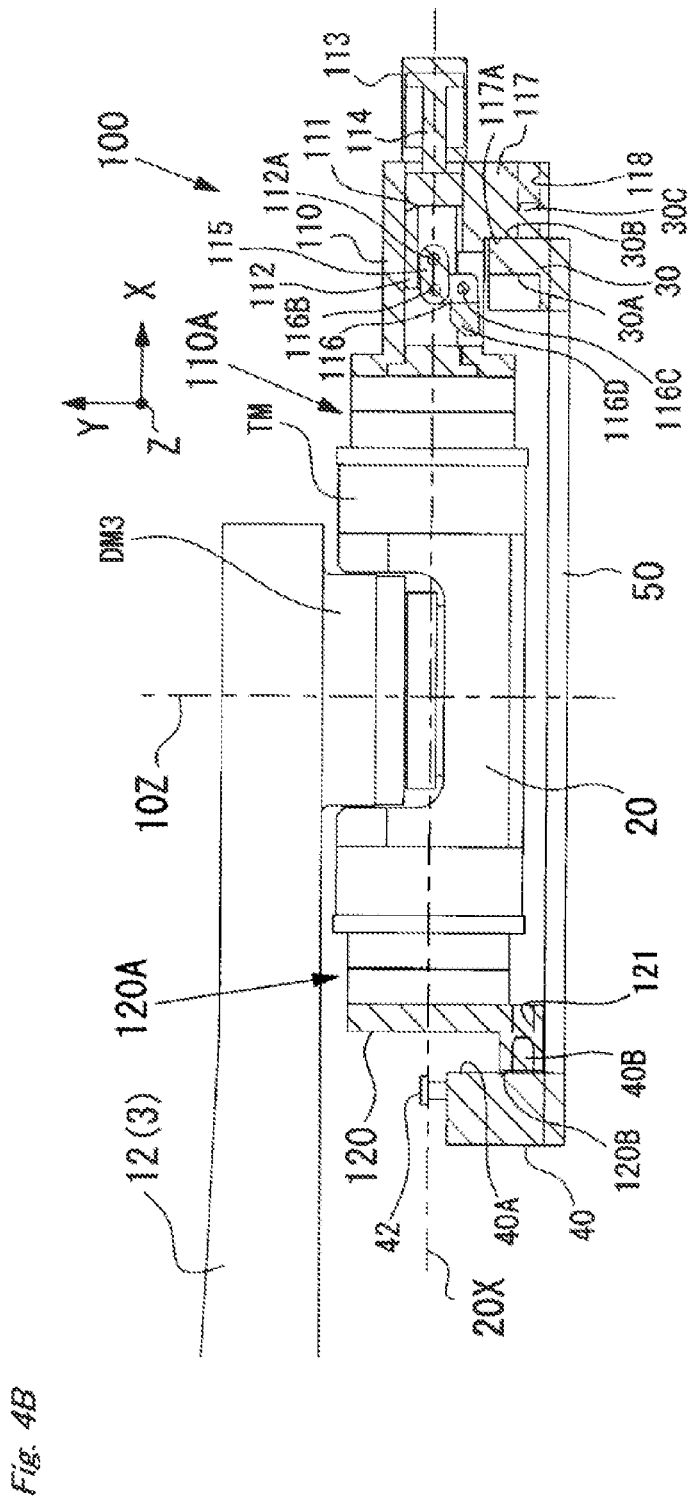
FIG. 4B is an enlarged sectional view for illustrating a disengagement state of the engagement device.
Figure 4C:
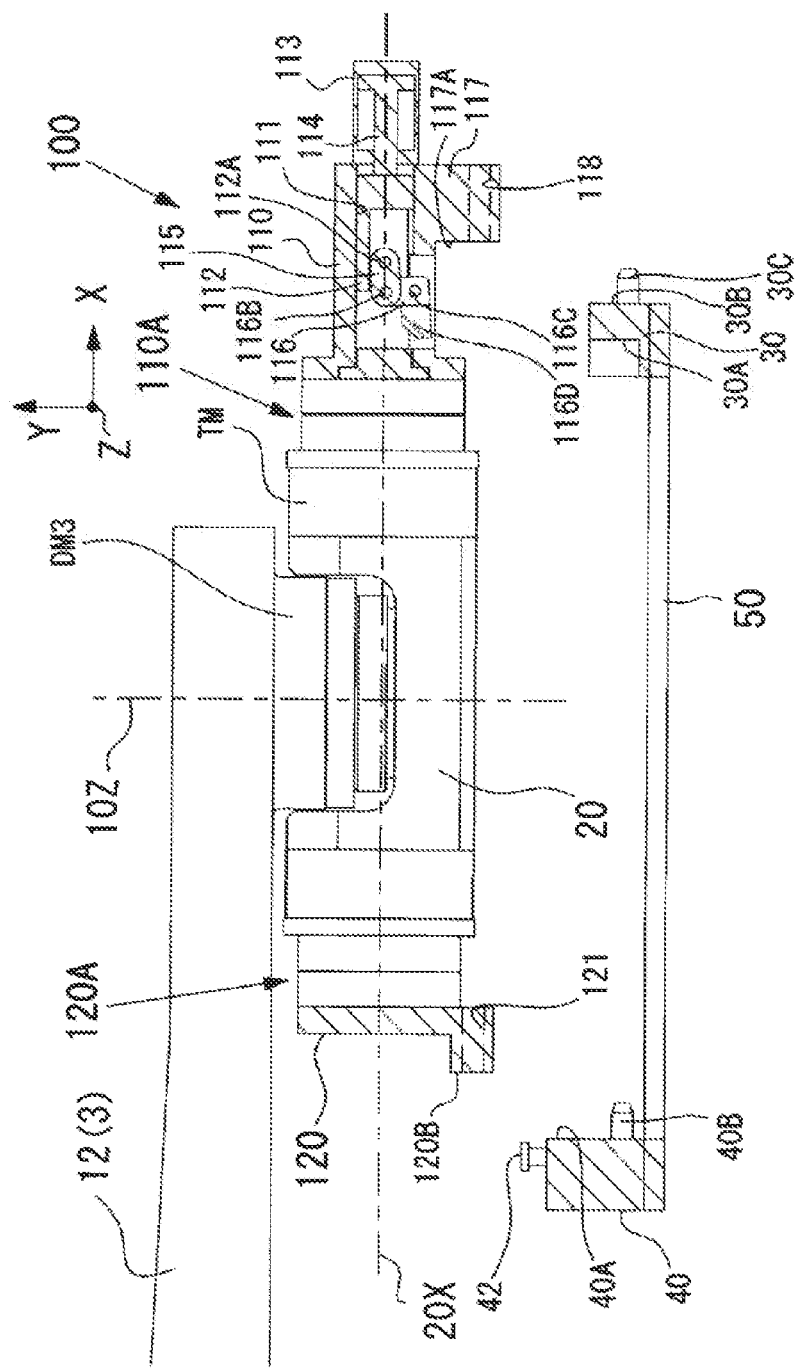
FIG. 4C is an enlarged sectional view for illustrating a separated state of the engagement device.
Figure 6:
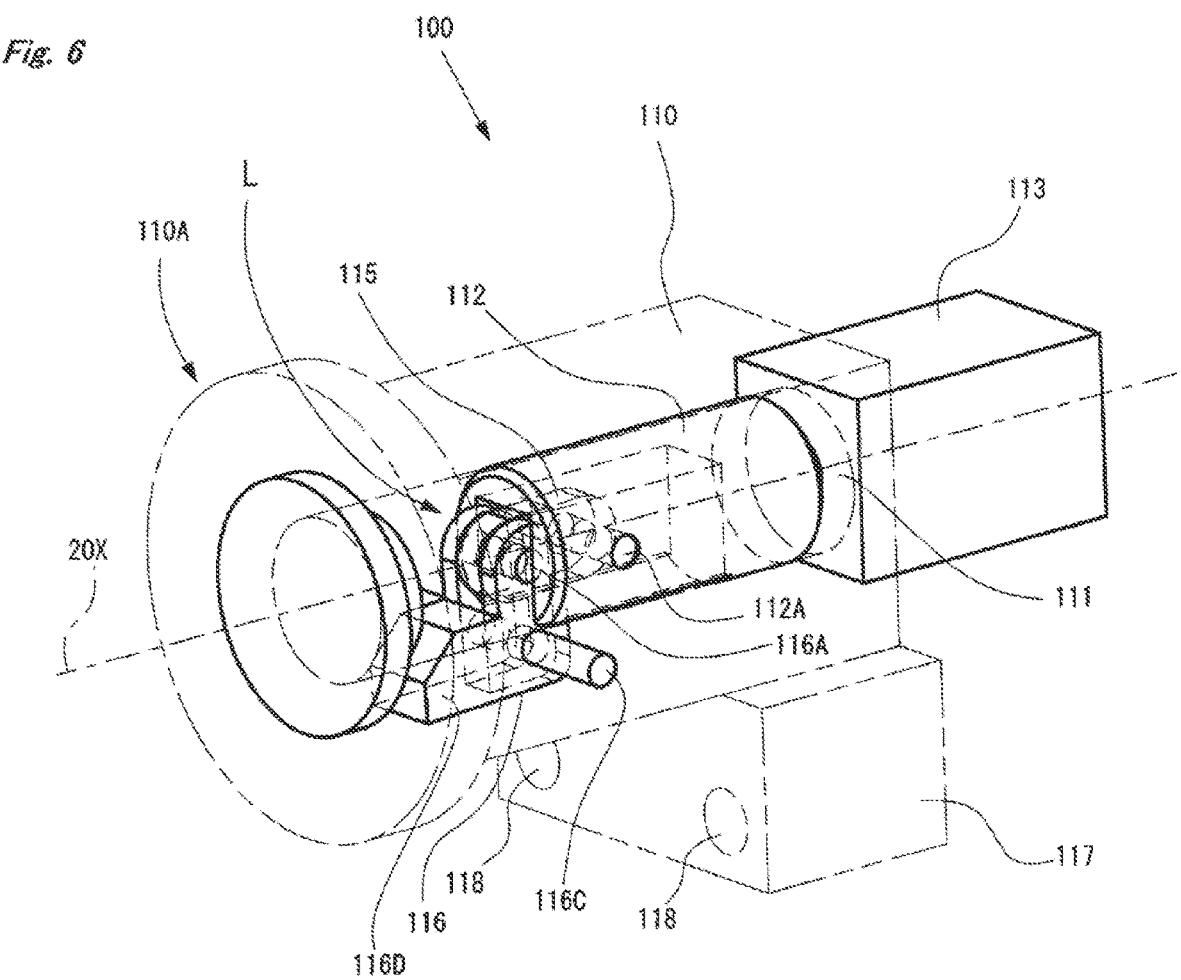
FIG. 6 is an enlarged perspective view for illustrating the link mechanism part (disengagement state) of the engagement device of the embodiment in an extracted manner.

In this embodiment, as illustrated in FIG. 4A to FIG. 4C, a support member (a swivel member) 20 supported so as to be rotatable (swivelable) about the third joint 10Z with respect to the workpiece conveying apparatus 1 (second arm 12) through intermediation of the workpiece holding device swivel drive mechanism DM3 is provided, and the engagement device 100 is supported so as to be rotatable about the fourth joint 20X with respect to the support member 20 through intermediation of the tilt drive mechanism TM and the like.

More specifically, as illustrated in FIG. 4A to FIG. 4C and FIG. 5A to FIG. 5C which are partial enlarged views of FIG. 4A to FIG. 4C, the engagement device 100 includes a first engagement portion 110 and a second engagement portion 120. The first engagement portion 110 is coupled to a rotation output shaft of the tilt drive mechanism TM and supported so as to be rotatable about the fourth joint 20X with respect to the support member 20 through intermediation of a bearing 110A and the like. The second engagement portion 120 is supported so as to be rotatable about the fourth joint 20X with respect to the support member 20 through intermediation of the bearing 120A rotatable about the fourth joint 20X and the like on an opposite side across the third joint 10Z.

On the inner side of the first engagement portion 110, a hollow cylinder 111 having a substantially circular cross section extends along the fourth joint 20X direction. On the inner side of the cylinder 111, a piston 112 is inserted (fitted) so as to be slidable along the fourth joint 20X direction.

Further, an actuator 113 such as an air cylinder being a linear drive mechanism is provided on the distal end side of the first engagement portion 110, and an output moving member 114, which is linearly reciprocated, of the actuator 113 is coupled to the piston 112. The direction of the reciprocating linear motion in this embodiment is a direction along the X direction in FIG. 4A to FIG. 4C and FIG. 5A to FIG. 5C.

Accordingly, when the actuator 113 is driven to move the output moving member 114, the piston (movable member) 112 coupled to the output moving member 114 moves along the fourth joint 20X direction inside the cylinder 111. The piston 112 corresponds to a movable member according to the present invention.

Further, a first coupling pin (or a hole) 112A that functions as a pivot shaft is integrally formed on the piston 112 so as to extend in a direction substantially orthogonal to the fourth joint 20X direction.

A first coupling member (a link member) 115 is turnably coupled to the first coupling pin 112A through intermediation of a first coupling hole (or a pin) 115A.

In configurations given here and below, a rotation support element such as a bearing may be interposed between each coupling hole and each coupling pin.

Here, the first coupling pin (or a hole) 112A or the first coupling hole (or a pin) 115A corresponds to a first coupling shaft according to the present invention.

Further, in the first coupling member 115, a second coupling hole (or a pin) 115B is formed at a predetermined distance from the first coupling hole 115A.

A second coupling member (an inflective locking member) 116 is turnably coupled to the second coupling hole 115B through intermediation of a second coupling pin (or a hole) 116A extending parallel to the first coupling pin 112A, and, in the second coupling member 116, a third coupling hole (or a pin) 116B is formed at a predetermined distance from the second coupling pin 116A.

Here, the second coupling hole (or a pin) 115B or the second coupling pin (or a hole) 116A corresponds to a second coupling shaft according to the present invention.

That is, the second coupling pin 116A turnably couples the first coupling member 115 and the second coupling member 116 to each other.

A third coupling pin 116C being a pivot shaft is inserted into the third coupling hole 116B, and the third coupling pin 116C is fixed to a main body of the first engagement portion 110 (as well as the workpiece conveying apparatus 1). The third coupling pin 116C extends in parallel to the first coupling pin 112A and the second coupling pin 116A.

Here, the third coupling hole (or a pin) 116B or the third coupling pin (or a hole) 116C corresponds to a third coupling shaft according to the present invention.

Further, the second coupling member 116 includes a locking portion (stopper) 116D. The locking portion 116D extends from a turning center of the third coupling hole 116B in a direction intersecting (for example, a direction substantially orthogonal to) a straight line connecting a turning center of the second coupling hole 115B (second coupling pin 116A) and the turning center of the third coupling hole 116B to each other.

Thus, the second coupling member 116 has an L shape (inverted L shape in FIG. 4B and FIG. 5B) as viewed in an axial direction of the turning center of the second coupling pin 116A or the third coupling hole 116B.

FIG. 4A and FIG. 5A are illustrations of an engagement state in which the output moving member 114 (piston 112) of the actuator 113 moves to a predetermined engagement position (left end: upstream end in the X direction).

Under the engagement state, the turning center (axis center) of the first coupling pin 112A (first coupling hole 115A) and the turning center (axis center) of the second coupling pin 116A (second coupling hole 115B) are arrayed on a line substantially orthogonal to the reciprocating linear motion direction of the piston 112 (vertical direction in FIG. 5A), and the locking portion (stopper) 116D restricts a position of the engagement portion 30 of the workpiece holding device 3 between the locking portion (stopper) 116D and an abutment surface 117A of an abutment portion (a position-determining portion) 117 of the first engagement portion 110 (by bringing the engagement portion 30 into abutment against the abutment surface 117A) (engagement state). That is, the second coupling member 116 keeps the first coupling member 115 orthogonal to the horizontal plane while the workpiece holding device 3 is bookended between the second coupling member 116 and the abutment portion 117.

The engagement portion 30 of the workpiece holding device 3 is formed integrally with the workpiece holding device 3, and includes, as illustrated in FIG. 4A, FIG. 5A, FIG. 4C, and FIG. 5C, a first abutment surface 30A and a second abutment surface 30B. The first abutment surface 30A is brought into abutment against the locking portion (stopper) 116D of the first engagement portion 110. The second abutment surface 30B is a surface opposite to the first abutment surface 30A and is brought into abutment against the abutment portion 117 of the first engagement portion 110.

Further, a positioning pin 30C extends in a direction substantially orthogonal to the first abutment surface 30A (second abutment surface 30B). Under the engagement state of FIG. 4A and FIG. 5A, the positioning pin 30C is inserted into a positioning pin hole 118 formed in the first engagement portion 110 so as to correspond to the positioning pin 30C to be positioned in the Y and Z directions in FIG. 5A to FIG. 5C.

In configurations given here and below, the positioning pin corresponds to an example of a positioning male element according to the present invention, and the positioning pin hole corresponds to an example of a positioning female element.

The positioning in the X direction is performed by abutment of the abutment surface 117A of the abutment portion 117 of the first engagement portion 110 and the second abutment surface 30B of the engagement portion 30 and abutment of the locking portion (stopper) 116D of the first engagement portion 110 and the first abutment surface 30A of the engagement portion 30.

In this embodiment, in order that the workpiece conveying apparatus 1 (second arm 12) can support the workpiece holding device 3 more reliably and stably, the second engagement portion 120 is formed on the side opposite to the first engagement portion 110 across the third joint 10Z. The second engagement portion 120 has a positioning pin hole 121 into which a positioning pin 40B having the same configuration as the positioning pin 30C is to be inserted. The positioning pin 40B is formed on the engagement portion 40 provided so as to correspond to the second engagement portion 120.

Further, at the left end (upstream end in the X direction) of the second engagement portion 120, there is formed an abutment surface 120B which is to be brought into abutment against the abutment surface 40A (downstream end in the X direction) of the engagement portion 40 when the positioning pin 40B is inserted into the positioning pin hole 121 to be in a predetermined engagement state. The engagement portion 40 is integrally formed with the engagement portion 30 through intermediation of a frame 50.

Thus, in the engagement state of FIG. 4A, through the engagement between the first engagement portion 110 and the engagement portion 30 and the engagement between the second engagement portion 120 and the engagement portion 40, the workpiece conveying apparatus 1 (second arm 12) can support the workpiece holding device 3 highly accurately and reliably without free movement or the like.

Further, FIG. 4B and FIG. 5B are illustrations of a retreated (disengaged) state in which the output moving member 114 (piston 112) of the actuator 113 moves to a predetermined retreated position (disengaged position: right end: downstream end in the X direction). For example, a state in which working pressure (for example, air pressure) is supplied to the actuator 113 is illustrated.

Under the retreated state, the turning center of the first coupling pin 112A (first coupling hole 115A) and the turning center of the second coupling pin 116A (second coupling hole 115B) are arrayed on a line parallel to the reciprocating linear motion direction of the piston 112 (horizontal direction in FIG. 4A to FIG. 4C and FIG. 5A to FIG. 5C), and the locking portion (stopper) 116D retreats from the engagement portion 30 of the workpiece holding device 3 so that the abutment portion 117 of the first engagement portion 110 can move away from the engagement portion 30 along the reciprocating linear motion direction of the piston 112 (along the same horizontal direction) (disengagement state).

The workpiece conveying apparatus 1 (second arm 12) is operated from the state of FIG. 4B and FIG. 5B to move the engagement device 100 integrated with the workpiece conveying apparatus 1 (second arm 12) along an axial direction of the positioning pin 30C and the positioning pin 40B in a direction of moving away from the engagement portion 30 and the engagement portion 40 of the workpiece holding device 3 so that the engagement device 100 of the workpiece conveying apparatus 1 (second arm 12) and the workpiece holding device 3 can be separated in the horizontal direction (X direction).

FIG. 4C and FIG. 5C are illustrations of a state in which the workpiece conveying apparatus 1 (second arm 12) is further raised from such separated state (state in which the workpiece conveying apparatus 1 (second arm 12) is moved to a downstream side in a Y direction).

Conversely, the workpiece conveying apparatus 1 (second arm 12) in a state of not including the workpiece holding devices 3 is lowered from the state of FIG. 4C and FIG. 5C, and then, is moved to an upstream side in the X direction so that the state of FIG. 4B and FIG. 5B can be obtained.

After that, the actuator 113 is driven (for example, supply of the air pressure is stopped), and the output moving member 114 (piston 112) is moved to the predetermined engagement position (left end: upstream end in the X direction) so that, by a link mechanism L to which the output moving member 114 (piston 112) is coupled at an upper portion, the locking portion (stopper) 116D can be brought into abutment against the first abutment surface 30A of the engagement portion 30 of the workpiece holding device 3, and the second abutment surface 30B of the engagement portion 30 can be brought into abutment (pressed) against the abutment surface 117A of the abutment portion 117 of the first engagement portion 110 (engagement state).

That is, in this embodiment, through intermediation of the link mechanism L including the first coupling member 115 coupled (linked) to the output moving member 114 (piston 112) and the second coupling member 116 coupled (linked) to the first coupling member 115, at the time of engagement (at the time of mounting), the output moving member 114 (piston 112) can be moved to the predetermined engagement position (mounted position) to move the locking portion (stopper) 116D of the second coupling member 116 to the engagement position so that the engagement portion 30 of the workpiece holding device 3 is brought into abutment (pressed) against the abutment surface 117A of the abutment portion 117 of the first engagement portion 110 (engagement state), and at the time of disengagement (at the time of removal: at the time of detachment), the output moving member 114 (piston 112) can be moved to a predetermined disengagement position (removal position: detachment position) to cause the locking portion (stopper) 116D of the second coupling member 116 to retreat from the engagement portion 30 of the workpiece holding device 3 so that the engagement portion 30 of the workpiece holding device 3 is moved away from the abutment surface 117A of the abutment portion 117 of the first engagement portion 110 (disengagement state).

In the above-mentioned link mechanism L of this embodiment, at the time of engagement illustrated in FIG. 4A and FIG. 5A, the turning center of the first coupling pin 112A (first coupling hole 115A) and the turning center of the second coupling pin 116A (second coupling hole 115B) are arrayed on the line substantially orthogonal to the reciprocating linear motion direction of the piston 112 (perpendicular direction in FIG. 4A to FIG. 4C and FIG. 5A to FIG. 5C, Y direction) (arrangement), whereas the turning center of the second coupling pin 116A (second coupling hole 115B) and the turning center of the third coupling pin 116C (third coupling hole 116B) are arrayed on the line parallel to (line along) the reciprocating linear motion direction of the piston 112 (horizontal direction in FIG. 4A to FIG. 4C and FIG. 5A to FIG. 5C, X direction) (arrangement).

Thus, when, under the engagement state, the engagement portion 30 of the workpiece holding device 3 is to move to push back the locking portion (stopper) 116D in order that the engagement portion 30 moves away from the abutment surface 117A of the abutment portion 117 of the first engagement portion 110, a force transmitted to the locking portion (stopper) 116D is to cause the second coupling member 116 to turn about the third coupling pin 116C in a clockwise direction in FIG. 4A to FIG. 4C and FIG. 5A to FIG. 5C. However, a straight line S2 (see FIG. 5A) connecting the second coupling pin 116A and the third coupling pin 116C of the second coupling member 116 to each other and a straight line S1 (see FIG. 5A) connecting the second coupling pin 116A and the first coupling pin 112A of the first coupling member 115 to each other are arranged so as to be orthogonal to each other, and hence the force is transmitted only in a direction passing through the straight line S1. Thus, in the first coupling pin 112A of the first coupling member 115, a component of a force of moving the piston 112 (output moving member 114) in the retreated position direction (downstream side in the X direction) is not generated.

That is, in this embodiment, under the engagement state, the locking portion (stopper) 116D does not move away from the engagement portion 30 of the workpiece holding device 3 unless the piston 112 moves through actuation of the actuator 113.

Meanwhile, when the output moving member 114 of the actuator 113 is returned to the retreated position from the engagement state, in association with this operation, through intermediation of the above-mentioned link mechanism L, the locking portion (stopper) 116D can be retreated from the engagement portion 30 of the workpiece holding device 3.

Thus, according to the engagement device of this embodiment, it is possible to provide a mounting and dismounting support mechanism for a workpiece holding device of a workpiece conveying apparatus, which is capable of causing the workpiece holding device 3 to be removably engaged with and supported on the workpiece conveying apparatus highly accurately and reliably by a simple operation without free movement, and consequently simplifying a replacement operation of the workpiece holding device and contributing to achievement of high-speed conveyance of the workpiece.

Figure 7A:
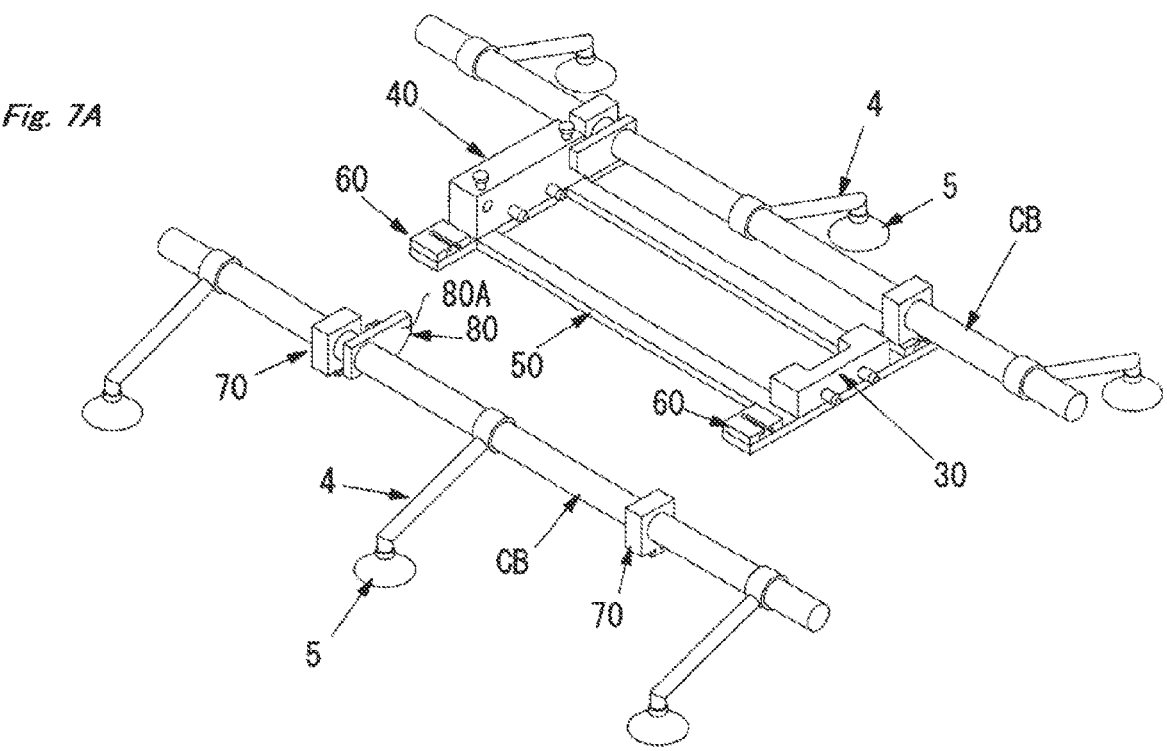
FIG. 7A is a perspective view for illustrating a configuration example (separated state) of a cross bar, which is mountable and dismountable, of the workpiece holding device according to the embodiment.
Figure 7B:
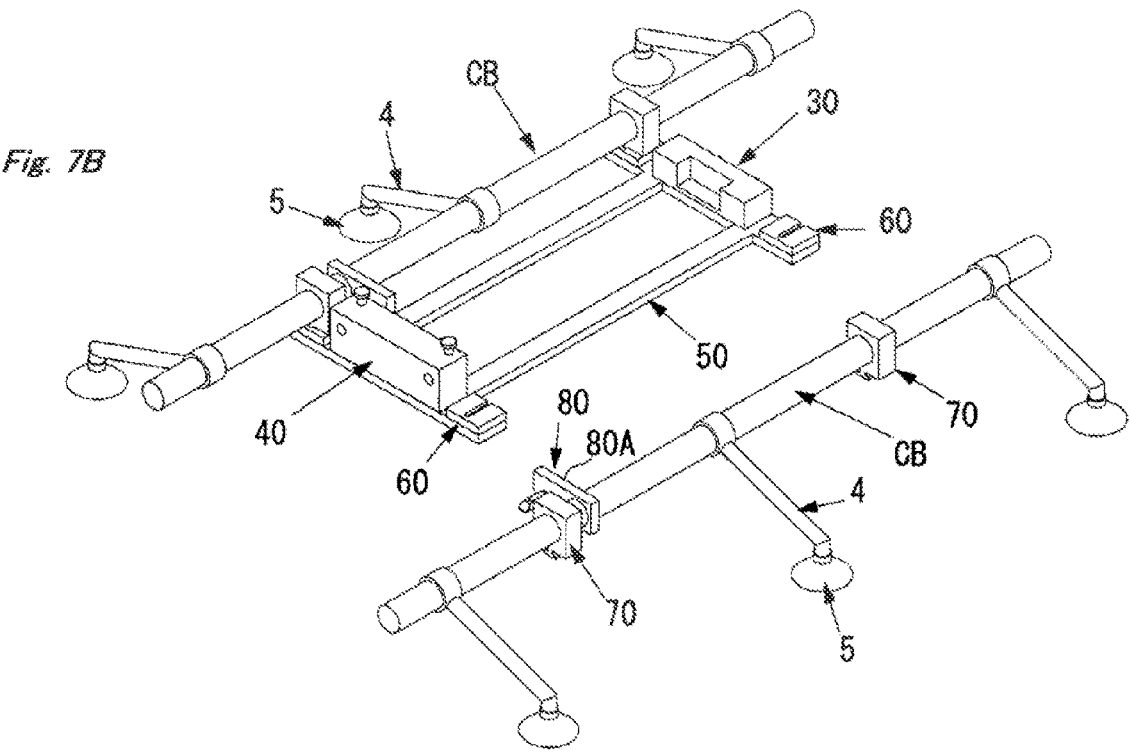
FIG. 7B is a perspective view as viewed in a direction different from that in FIG. 7A.

Further, as illustrated in FIG. 7A and FIG. 7B, in the workpiece holding device 3 according to this embodiment, the cross bar CB is removably mounted to the frame 50 that supports the engagement portion 30 and the engagement portion 40. The cross bar CB including the leg portions 4, the drawing devices 5, and the like corresponds to a workpiece holding tool according to the present invention.

That is, in the workpiece holding device 3 according to this embodiment, for example, the cross bars CB different from each other in the number or the arrangement (positions) of the leg portions 4 or the drawing devices 5 can be easily installed for replacement to the frame 50.

Figure 8:
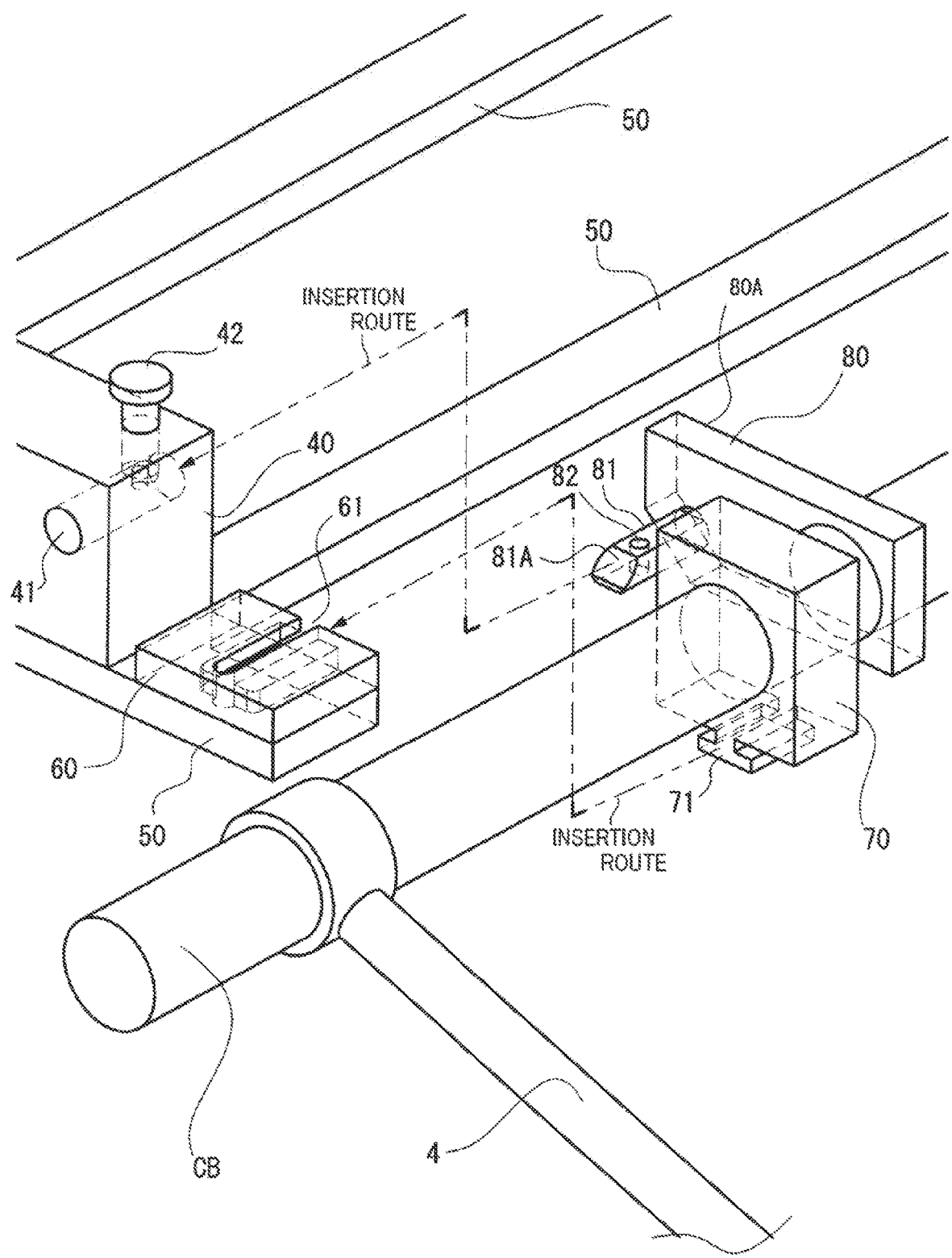
FIG. 8 is an enlarged perspective view for illustrating an example of a mounting and dismounting mechanism for a cross bar with respect to the workpiece holding device according to the embodiment.
Figure 9:
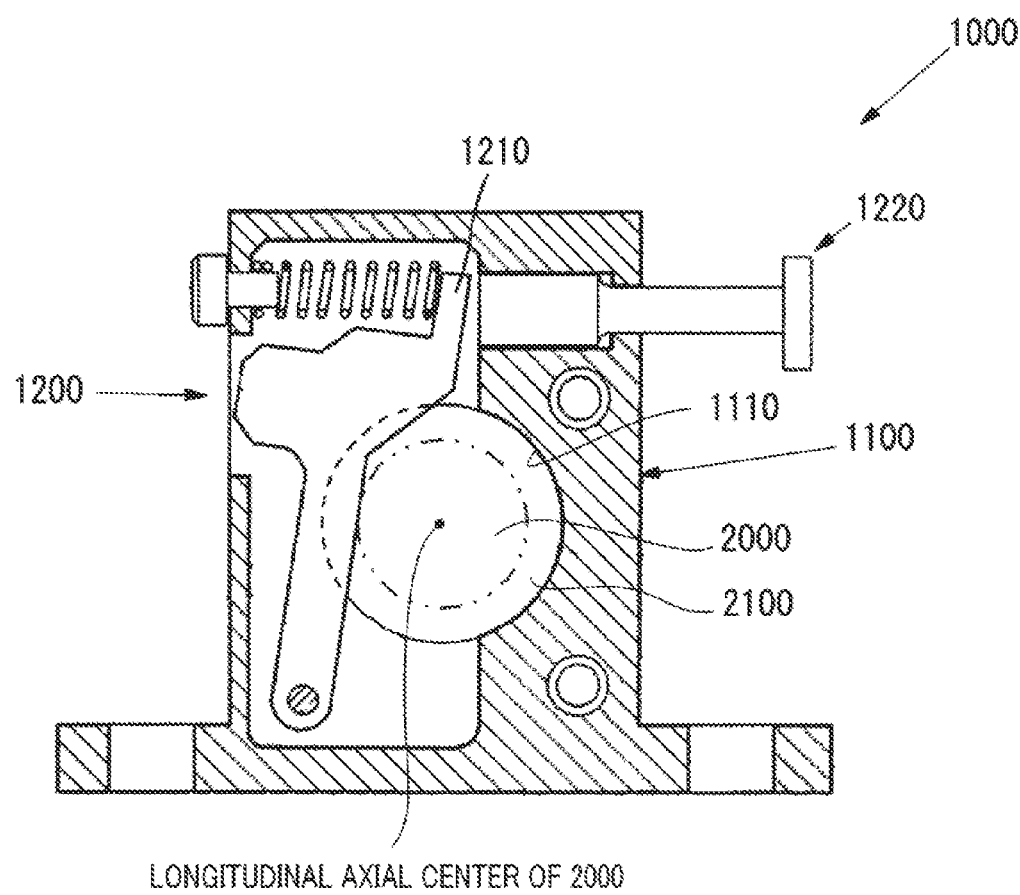
FIG. 9 is a view for illustrating an example of removably mounting an attachment being a workpiece holding tool with respect to a related-art workpiece conveying apparatus.

Specifically, as illustrated in FIG. 8 in an enlarged manner, engagement blocks 70 are integrally mounted to the cross bar CB, and an engagement rail 71 having an inverted T-shaped cross section is arranged on the engagement block 70 along a longitudinal direction of the cross bar CB.

Further, an engagement plate 80 extending in a direction substantially orthogonal to the longitudinal direction of the cross bar CB is integrally mounted to the cross bar CB, and a positioning pin 81 is provided upright on the engagement plate 80 in parallel to the cross bar CB. A distal end of the positioning pin 81 has a tapered surface 81A cut into a tapered shape on its upper surface.

Further, rail engagement portions 60 are provided on the frame 50 side so as to correspond to the engagement rails 71 of the engagement blocks 70, and a groove 61 having an inverted T-shaped cross section for accommodating the engagement rail 71 is engraved in the rail engagement portion 60.

The engagement rail 71 having an inverted T-shaped cross section corresponds to an example of a positioning male element according to the present invention, and the groove 61 having an inverted T-shaped cross section corresponds to an example of a positioning female element.

Further, a positioning hole 41 is opened in the engagement portion 40 on the frame 50 side so as to correspond to the positioning pin 81 of the engagement plate 80, and a fixing plunger 42 that can protrude and retreat in the substantially orthogonal direction with respect to the positioning hole 41 is provided. The fixing plunger 42 is biased by a spring or the like in a direction of protruding with respect to the positioning hole 41.

When the engagement block 70 and the engagement plate 80 are to be engaged with the engagement portions 40 and 60 from the disengagement state of FIG. 8 to cause the cross bar CB to be supported on the frame 50 (as well as the workpiece holding device 3), the cross bar CB is moved along an insertion route of FIG. 8 to cause the engagement rail 71 to be inserted into the groove 61 and cause the positioning pin 81 to be inserted into the positioning hole 41. At this time, as the positioning pin 81 advances, the tapered surface 81A is inserted while pushing up the fixing plunger 42 against the biasing force.

Further, when the engagement block 70, the engagement plate 80, and the engagement portions 40 and 60 are brought to predetermined engagement positions, the fixing plunger 42 is inserted into a fixing plunger engagement hole 82 opened in the direction substantially orthogonal to the longitudinal direction of the positioning pin 81 by the biasing force so that the engagement plate 80 and the engagement portion 40 are engaged with each other, and the cross bar CB is supported on the frame 50 (as well as the workpiece holding device 3).

As illustrated in FIG. 7A and FIG. 7B, at a predetermined longitudinal position on the cross bar CB, another one engagement block 70 is provided, and an engagement portion 60 corresponding thereto is provided on the frame 50.

With this, the cross bar CB can be supported on the frame 50 as well as the workpiece holding device 3 stably and reliably without free movement, thereby being capable of contributing to achievement of high-speed conveyance of the workpiece.

Further, in this embodiment, when the workpiece holding device 3 is to be mounted to a distal end of a conveying arm (second arm 12) of the workpiece conveying apparatus 1, the positioning pin 40B (30C) of the workpiece holding device 3 is inserted into the positioning pin hole 121 (118) on the workpiece conveying apparatus 3 (second arm 12) side along the X direction. At this time, a restricting portion 122 formed on the second engagement portion 120 acts on a restricting surface 80A of the engagement plate 80 integrally provided on the cross bar CB freely removably mounted to the workpiece holding device 3 so as to prevent movement of the engagement plate 80 as well as the cross bar CB in a direction of moving away from the engagement portion 40 to restrict (hinder) the movement.

Thus, in this embodiment, there can be achieved a highly reliable configuration in which the cross bar CB is not removed from the workpiece holding device 3 unless the workpiece holding device 3 is removed from the conveying arm (second arm 12) of the workpiece conveying apparatus 1.

A link mechanism L of a mounting and dismounting support mechanism for a workpiece holding device of a workpiece conveying apparatus according to this embodiment includes: a first coupling member (115) coupled so as to be tunable (rotatable) about a first coupling shaft (112A) integrally formed on (extending from) a movable member (112), which is linearly reciprocable in a predetermined direction, in a direction substantially orthogonal to the reciprocating linear motion direction; and a second coupling member (116) coupled so as to be turnable about a second coupling shaft (116A) formed on (extending from) the first coupling member (115) in parallel to and at a predetermined distance from the first coupling shaft (112A), in which the second coupling member (116) is turnably supported by a third coupling shaft (116C) integrally formed on (extending from) the workpiece conveying apparatus (3) (second arm 12) in parallel to and at a predetermined distance from the second coupling shaft (116A), in which the second coupling member (116) includes a locking portion (stopper) (116D) that turns (moves) about the third coupling shaft (116C) in a predetermined direction through intermediation of the first coupling member (115) and comes into abutment against an engagement portion (30) to lock the engagement portion (30) with respect to the workpiece conveying apparatus (3) (second arm 12) when the movable member (112) moves to a predetermined engagement position, and turns (moves) about the third coupling shaft (116C) through intermediation of the first coupling member (115) in a direction reverse to the predetermined direction to be retreated from the engagement portion (30) when the movable member (112) moves to a predetermined retreated position, in which, when the movable member (112) moves to the predetermined engagement position, a straight line S1 connecting the first coupling shaft (112A) and the second coupling shaft (116A) to each other in a turning plane (plane in FIG. 4A to FIG. 4C and FIG. 5A to FIG. 5C) and a straight line S2 connecting the second coupling shaft (116A) and the third coupling shaft (116C) to each other in the turning plane (plane in FIG. 4A to FIG. 4C and FIG. 5A to FIG. 5C) are orthogonal to each other, and in which, under this state, the locking portion (stopper) 116D restricts a position of the engagement portion (30) of the workpiece holding device (3) between the locking portion (stopper) 116D and an abutment surface 117A of an abutment portion 117 of a first engagement portion (110) (by bringing the engagement portion (30) into abutment against the abutment surface 117A) (engagement state).

With this configuration, according to this embodiment, due to an action from the locking portion (stopper) 116D side, a component of a force of moving the movable member (112) in the retreated position direction (downstream side in the X direction) is not generated in the first coupling shaft (112A) through intermediation of the second coupling member (116) and the first coupling member (115).

That is, this embodiment has an action and an effect that, under the engagement state, the locking portion (stopper) (116D) does not move away from the engagement portion (30) of the workpiece holding device (3) unless the piston 112 moves through actuation of the actuator 113.

Meanwhile, when the movable member (112) is returned to the retreated position from the engagement state, in association with this operation, the locking portion (stopper) 116D can be caused to be retreated from the engagement portion 30 of the workpiece holding device 3 through intermediation of the above-mentioned link mechanism L.

That is, according to the engagement device including the link mechanism L of this embodiment, it is possible to provide a mounting and dismounting mechanism for a workpiece holding device of a workpiece conveying apparatus, which is capable of causing the workpiece holding device (tool holder) to be removably engaged with and supported on the workpiece conveying apparatus highly accurately and reliably by a simple operation without free movement, and consequently simplifying a replacement operation of the workpiece holding device and contributing to achievement of high-speed conveyance of the workpiece.

The engagement device 100 according to this embodiment is arranged at a height equal to or lower than that of the tilt drive mechanism TM (vertical direction: up-and-down direction in FIG. 4A to FIG. 4C and FIG. 5A to FIG. 5C), and hence the thickness of the distal end portion of the workpiece conveying apparatus can be maintained to be small.

The effect obtained by reducing the thickness of the distal end portion of the workpiece conveying apparatus is described below.

First, in a press machine in an upstream step, when press working on a workpiece is completed, an upper die is raised and is separated from the pressed workpiece and a lower die. After that, the workpiece holding device of the workpiece conveying apparatus enters the press machine in the upstream step in order to unload the pressed workpiece. Here, when the engagement device 100 being the distal end portion of the workpiece holding device is thick, it is required to avoid interference between the workpiece holding device and the upper die. Thus, the engagement device 100 enters the press machine in the upstream step after the upper die is raised by a height equal to or larger than the thickness of the engagement device 100. In contrast, when the thickness of the engagement device 100 is small, even when a raising amount of the upper die is small, the engagement device 100 can enter the press machine in the upstream step due to its small thickness. That is, even when the upper die is raised only up to a relatively low height position, the workpiece holding device including the engagement device 100 can enter the press machine in the upstream step without interfering with the upper die. Thus, at an earlier timing, the pressed workpiece in the press machine in the upstream step can be unloaded to the outside of the press machine.

After that, the workpiece holding device of the workpiece conveying apparatus which holds the pressed workpiece enters the press machine in the downstream step, and the pressed workpiece is placed on the lower die. The workpiece holding device having released the pressed workpiece retreats to the outside of the press machine in the downstream step. In operations of entry, workpiece placement, and retreating, the workpiece holding device including the engagement device 100 is required to avoid interference with the die.

Here, a case in which the engagement device 100 being the distal end portion of the workpiece holding device is thick is considered. In this case, when the press machine in the downstream step executes a low-speed operation, a period of time required for the upper die from raising to lowering is prolonged, and hence a risk of the interference between the workpiece holding device and the upper die is low. However, as the speed of the operation increases, a period of time required for the die from raising to lowering is shortened, and hence it becomes difficult to suppress the above-mentioned risk of the interference. In contrast, a case in which the engagement device 100 is thin is considered. In this case, the risk of the interference can be suppressed in accordance with the small thickness of the engagement device 100 even during the high-speed operation, that is, an operation in which the period of time required for the die from raising to lowering is short, as well as when the press machine in the downstream step executes a low-speed operation. Thus, even the press machine that executes the high-speed operation can stably execute entry, workpiece placement, and retreating of the workpiece holding device.

Thus, according to the workpiece conveying apparatus of the present invention, through the operation in association with the press machine, it is possible to contribute to an increase in speed of the press line, in other words, an increase in workpiece conveyance speed.

Further, in this embodiment, the actuator 113 such as an air cylinder being the linear drive mechanism is configured to move the output moving member 114 (piston 112) to the predetermined engagement position (position in FIG. 4A and FIG. 5A) when supply of the air pressure is stopped, and to move the output moving member 114 (piston 112) to the predetermined retreated position (position in FIG. 4B and FIG. 5B) when the air pressure is supplied. Specifically, in order to avoid a risk in that, when the air pressure supply is stopped due to an abnormality or any factor, the engagement state is canceled (the workpiece holding device moves in the retreated position direction) due to vibration or input from the outside, as a result, the workpiece holding device is accidentally removed from the workpiece conveying apparatus, the workpiece holding device moves to the engagement position under a state in which supply of the air pressure is stopped, and is maintained at the position.

Such a risk is also assumed that, even though the output moving member 114 (piston 112) is maintained at the engagement position under the state in which the air pressure is stopped, the engagement state is canceled (the output moving member 114 (piston 112) performs micromovement in the retreated position direction) due to vibration or input from the outside is assumed. Thus, the output moving member 114 (piston 112) may be elastically biased to the predetermined engagement position by an elastic element 300 such as a spring, or may be attracted and held by a magnetic attraction element 301 such as a magnet.

Further, in this embodiment, an example in which the actuator 113, the output moving member 114 (piston 112), the link mechanism L, and the like are mounted on the workpiece conveying apparatus 1 (engagement device 100) side, but the present invention is not limited thereto. The actuator 113, the output moving member 114 (piston 112), the link mechanism L, and the like may be mounted on the workpiece holding device 3 side, and the engagement portions 30 and 40 may be mounted on the workpiece conveying apparatus 1 (engagement device 100) side.

Further, in this embodiment, as the workpiece conveying apparatus, the workpiece conveying apparatus 1 including the arm units (the first arm, the second arm, and the like) that are swingable in a substantially horizontal plane as illustrated in FIG. 1 is described as an example, but the present invention is not limited thereto, and the mounting and dismounting support mechanism for a workpiece holding device according to the present invention may be applied to workpiece conveying apparatus having other configurations.

As described above, according to the present invention, it is possible to provide a mounting and dismounting mechanism for a workpiece holding device of a workpiece conveying apparatus, which is capable of causing the workpiece holding device to be removably engaged with and supported on the workpiece conveying apparatus highly accurately and reliably by a simple operation without free movement, and consequently simplifying a replacement operation of the workpiece holding device and contributing to achievement of high-speed conveyance of the workpiece.

The embodiment described above is merely an example for describing the present invention, and various modifications may be made without departing from the gist of the present invention.

What is claimed is:

1. A mounting and dismounting support mechanism for a workpiece holding device of a workpiece conveying apparatus, which is configured to cause a workpiece holding device that freely removably holds a workpiece to be freely removably supported on a workpiece conveying apparatus, the workpiece conveying apparatus including one of a positioning male element or a positioning female element, and the workpiece holding device including one of a positioning female element or a positioning male element corresponding to the one of the positioning male element or the positioning female element of the workpiece conveying apparatus, the one of the positioning male element or the positioning female element of the workpiece holding device being inserted into the one of the positioning female element or the positioning male element of the workpiece conveying apparatus so that the workpiece holding device and the workpiece conveying apparatus are brought into abutment against each other at a predetermined position to perform positioning between the workpiece holding device and the workpiece conveying apparatus, the mounting and dismounting support mechanism comprising:

a movable member which is mounted to at least one of the workpiece conveying apparatus or the workpiece holding device, and is linearly reciprocable along the insertion direction by a linear drive mechanism;

a first coupling shaft extending integrally with the movable member along a direction substantially orthogonal to the reciprocating linear motion direction;

a first coupling member coupled so as to be turnable about the first coupling shaft;

a second coupling shaft extending integrally with the first coupling member in parallel to and at a predetermined distance from the first coupling shaft; and a second coupling member coupled so as to be turnable about the second coupling shaft, wherein the second coupling member is turnably supported by a third coupling shaft integrally extending from the at least one of the workpiece conveying apparatus or the workpiece holding device in parallel to and at a predetermined distance from the second coupling shaft, wherein the second coupling member includes a locking portion that turns about the third coupling shaft in a predetermined direction through intermediation of the first coupling member and comes into abutment against an engagement portion of another one of the workpiece conveying apparatus or the workpiece holding device to lock the engagement portion with respect to the at least one of the workpiece conveying apparatus or the workpiece holding device when the movable member moves to a predetermined engagement position, and turns about the third coupling shaft through intermediation of the first coupling member in a direction reverse to the predetermined direction to be retreated from the engagement portion when the movable member moves to a predetermined retreated position, and wherein, when the movable member moves to the predetermined engagement position, a straight line connecting the first coupling shaft and the second coupling shaft to each other in a plane orthogonal to the first coupling shaft and the second coupling shaft and a straight line connecting the second coupling shaft and the third coupling shaft to each other in a plane orthogonal to the second coupling shaft and the third coupling shaft are orthogonal to each other, and wherein an outer periphery of the movable member in a direction along the straight line connecting the first coupling shaft and the second coupling shaft at the predetermined engagement position is fitted to an inner periphery of a cylinder which extends along the insertion direction integrally with the workpiece conveying apparatus or the workpiece holding device to which the movable member is mounted.

2. The mounting and dismounting support mechanism for a workpiece holding device of a workpiece conveying apparatus according to claim 1, wherein the workpiece holding device includes one of a positioning female element or a positioning male element corresponding to one of a positioning male element or a positioning female element provided in a workpiece holding tool that freely removably holds a workpiece, wherein, under a state in which the one of the positioning male element or the positioning female element of the workpiece holding tool is inserted into the one of the positioning female element or the positioning male element of the workpiece holding device so that the workpiece holding tool and the workpiece holding device are brought into abutment against each other at a predetermined position to perform positioning between the workpiece holding tool and the workpiece holding device, when the one of the positioning male element or the positioning female element of the workpiece holding device is inserted into the one of the positioning male element or the positioning female element of the workpiece conveying apparatus so that the workpiece holding device and the workpiece conveying apparatus are brought into abutment against each other at the predetermined position to perform positioning between the workpiece holding device and the workpiece conveying apparatus, a restricting portion provided in the workpiece conveying apparatus acts on a part of the workpiece holding tool to restrict movement of the workpiece holding tool in a direction of moving away from the workpiece holding device.

3. The mounting and dismounting support mechanism for a workpiece holding device of a workpiece conveying apparatus according to claim 2, further comprising one of an elastic element that elastically biases the movable member toward a predetermined engagement position when the movable member moves to the predetermined engagement position or a magnetic attraction element that attracts and holds the movable member at the predetermined engagement position when the movable member moves to the predetermined engagement position.

4. The mounting and dismounting support mechanism for a workpiece holding device of a workpiece conveying apparatus according to claim 1, further comprising one of an elastic element that elastically biases the movable member toward a predetermined engagement position when the movable member moves to the predetermined engagement position or a magnetic attraction element that attracts and holds the movable member at the predetermined engagement position when the movable member moves to the predetermined engagement position.

5. A workpiece conveying apparatus, comprising:
a conveying arm which is rotatable within a horizontal plane;
a swivel member supported at a distal end of the conveying arm;
a cylinder fixed to the swivel member in a horizontal direction;
a piston slidable in the cylinder;
a link member which is rotatably supported by a first coupling shaft as provided in the piston;
an inflective locking member which is rotatably supported via a second coupling shaft as provided in the link member and via a third coupling shaft as provided in the cylinder; and
a position-determining portion provided to the cylinder,
wherein the inflective locking member keeps a straight line connecting the first coupling shaft and the second coupling shaft in the link member orthogonal to the horizontal plane while a workpiece holding device is bookended between the inflective locking member and the position-determining portion, and
wherein an outer periphery of the piston in a direction along the straight line connecting the first coupling shaft and the second coupling shaft in a state that the workpiece holding device is bookended between the inflective locking member and the position-determining portion is fitted to an inner periphery of the cylinder.

6. The workpiece conveying apparatus according to the claim 5, wherein the position-determining portion provided under the cylinder.

7. A mounting and dismounting support mechanism for a workpiece holding device of a workpiece conveying apparatus, which is configured to cause a workpiece holding device that freely removably holds a workpiece to be freely removably supported on a workpiece conveying apparatus,
the workpiece conveying apparatus including one of a positioning male element or a positioning female element which extends parallel to a plane for holding the workpiece in the workpiece holding device, and the workpiece holding device including one of a positioning female element or a positioning male element corresponding to the one of the positioning male element or the positioning female element of the workpiece conveying apparatus,
the one of the positioning male element or the positioning female element of the workpiece holding device being inserted into the one of the positioning female element or the positioning male element of the workpiece conveying apparatus so that the workpiece holding device and the workpiece conveying apparatus are brought into abutment against each other at a predetermined position to perform positioning between the workpiece holding device and the workpiece conveying apparatus,
the mounting and dismounting support mechanism comprising:
a movable member which is mounted to at least one of the workpiece conveying apparatus or the workpiece holding device, and is linearly reciprocable along the insertion direction by a linear drive mechanism;
a first coupling shaft extending integrally with the movable member along a direction substantially orthogonal to the reciprocating linear motion direction;
a first coupling member coupled so as to be turnable about the first coupling shaft;
a second coupling shaft extending integrally with the first coupling member in parallel to and at a predetermined distance from the first coupling shaft; and
a second coupling member coupled so as to be turnable about the second coupling shaft,
wherein the second coupling member is turnably supported by a third coupling shaft integrally extending from the at least one of the workpiece conveying apparatus or the workpiece holding device in parallel to and at a predetermined distance from the second coupling shaft,
wherein the second coupling member includes a locking portion that turns about the third coupling shaft in a predetermined direction through intermediation of the first coupling member and comes into abutment against an engagement portion of another one of the workpiece conveying apparatus or the workpiece holding device to lock the engagement portion with respect to the at least one of the workpiece conveying apparatus or the workpiece holding device when the movable member moves to a predetermined engagement position, and turns about the third coupling shaft through intermediation of the first coupling member in a direction reverse to the predetermined direction to be retreated from the engagement portion when the movable member moves to a predetermined retreated position, and
wherein, when the movable member moves to the predetermined engagement position, a straight line connecting the first coupling shaft and the second coupling shaft to each other in a plane orthogonal to the first coupling shaft and the second coupling shaft and a straight line connecting the second coupling shaft and the third coupling shaft to each other in a plane orthogonal to the second coupling shaft and the third coupling shaft are orthogonal to each other.

* * * * *